United States Patent
Choi et al.

(10) Patent No.: US 9,565,617 B2
(45) Date of Patent: Feb. 7, 2017

(54) METHOD AND APPARATUS FOR CONFIGURING ROUTING PATH IN WIRELESS COMMUNICATION SYSTEM

(71) Applicant: Samsung Electronics Co., Ltd., Suwon-si, Gyeonggi-do (KR)

(72) Inventors: Ji-Hyeon Choi, Suwon-si (KR); Kyu-Il Yeon, Hwaseong-si (KR); Han-Seok Kim, Seoul (KR); Jun-Sung Lee, Guri-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 14/072,087

(22) Filed: Nov. 5, 2013

(65) Prior Publication Data

US 2014/0133311 A1    May 15, 2014

(30) Foreign Application Priority Data

Nov. 9, 2012 (KR) .................. 10-2012-0126769

(51) Int. Cl.
*H04W 40/20* (2009.01)
*H04W 40/28* (2009.01)

(52) U.S. Cl.
CPC .......... *H04W 40/20* (2013.01); *H04W 40/28* (2013.01)

(58) Field of Classification Search
CPC ...... H04W 40/20; H04W 40/26; H04W 40/28; H04W 40/30; H04W 40/32
See application file for complete search history.

(56) References Cited

U.S. PATENT DOCUMENTS

| | | | |
|---|---|---|---|
| 2005/0169238 A1* | 8/2005 | Yang | H04L 45/02 370/351 |
| 2005/0190717 A1* | 9/2005 | Shu | H04L 45/00 370/328 |
| 2009/0207783 A1* | 8/2009 | Choi | H04W 40/026 370/328 |
| 2010/0177681 A1* | 7/2010 | Sahinoglu | G01S 5/12 370/328 |
| 2010/0208739 A1 | 8/2010 | Ofri | |
| 2010/0254309 A1 | 10/2010 | Mankins et al. | |
| 2010/0309841 A1 | 12/2010 | Conte | |
| 2011/0038306 A1 | 2/2011 | Potkonjak | |
| 2011/0142159 A1 | 6/2011 | Jeong et al. | |
| 2011/0182233 A1* | 7/2011 | Lee | H04W 40/20 370/328 |
| 2011/0211472 A1 | 9/2011 | Ghanadan et al. | |

(Continued)

OTHER PUBLICATIONS

Candidate Neighbours to Rebrodcast the RREQ for Efficient flooding in Mobile Ad hoc Network, Sofian Hamad et al., IEEE, 2011.*

*Primary Examiner* — Habte Mered
(74) *Attorney, Agent, or Firm* — Jefferson IP Law, LLP

(57) ABSTRACT

A method and apparatus for configuring a routing path in a wireless communication system are provided. The method includes measuring a first distance between the terminal and a target terminal, transmitting information of the measured first distance to at least one neighboring terminal, receiving a second distance measured for the target terminal with respect to the terminal from the at least one neighboring terminal, and determining a neighboring terminal of which the second distance is the longest as a next terminal of the routing path.

16 Claims, 16 Drawing Sheets

(56) References Cited

U.S. PATENT DOCUMENTS

| | | | |
|---|---|---|---|
| 2011/0228777 A1 | 9/2011 | Samajpati | |
| 2011/0235636 A1 | 9/2011 | Hsiu et al. | |
| 2011/0251790 A1 | 10/2011 | Liotopoulos et al. | |
| 2011/0261738 A1 | 10/2011 | Mukherjee | |
| 2012/0020285 A1 | 1/2012 | Cheon et al. | |
| 2012/0044864 A1 | 2/2012 | Zhang et al. | |
| 2012/0294152 A1* | 11/2012 | Yousefi'zadeh | H04W 40/12 370/238 |
| 2013/0290560 A1* | 10/2013 | Chaki | H04W 40/02 709/238 |
| 2014/0029624 A1* | 1/2014 | Vasseur | H04W 40/28 370/401 |

* cited by examiner

METHOD AND APPARATUS FOR CONFIGURING ROUTING PATH IN WIRELESS COMMUNICATION SYSTEM

CROSS-REFERENCE TO RELATED APPLICATION(S)

This application claims the benefit under 35 U.S.C. §119(a) of a Korean patent application filed on Nov. 9, 2012 in the Korean Intellectual Property Office and assigned Serial No. 10-2012-0126769, the entire disclosure of which is hereby incorporated by reference.

TECHNICAL FIELD

The present disclosure relates to a wireless communication system. More particularly, the present disclosure relates to configuring a routing path between terminals.

BACKGROUND

An ad-hoc wireless network is a type of a peer-to-peer mode for performing direct communication among a plurality of radio stations without the aid of an access point or other wired network connections. The ad-hoc wireless network is useful since a wireless network can be configured rapidly and easily in a place where a wireless infrastructure does not exist.

In the ad-hoc wireless network, a routing path is configured by selecting an intermediary node (or an intermediary terminal) between a source terminal and a target terminal (or a destination terminal) on the basis of a routing algorithm. Most of well-known routing algorithms aim to select a minimum number of intermediary nodes between the source terminal and the target terminal. However, a routing path having the minimum number of intermediary nodes is not necessarily an optimal routing path. For example, if the intermediary node between the source terminal and the target terminal is located at an edge of a coverage region of the source terminal, there is a disadvantage in that the routing path, which transmits data, may be broken due to a movement of the source terminal or the intermediary node. However, a routing path formed with a relatively large number of intermediary nodes between the source terminal and the target terminal disadvantageously leads to an increase in an amount of power consumed among the plurality of intermediary nodes.

For example, a Location-Aided Routing (LAR) algorithm is a representative routing algorithm which uses location information selected from among well-known routing algorithms. The LAR is an algorithm for determining an expected zone in which the target terminal can move at an average speed during a unit time and a request zone in which the source terminal must transmit a message according to the expected zone, and for selecting an intermediary terminal within the request zone. The LAR disadvantageously delivers many messages unnecessarily since the source terminal transmits and receives a message for configuring a routing path with respect to all terminals in the request zone. Also, since an average speed of the target terminal is used, an error may occur when the expected zone is determined when there is a significant change in a movement speed of the target terminal since such a change may have an effect on a calculation used to determine the request zone. That is, there is a disadvantage in that the conventional LAR unnecessarily consumes the computation and transmission power of all terminals included in the request zone.

Therefore, a need exists to provide a routing algorithm which takes into consideration both an amount of transmission power consumed by a terminal and a broken routing path phenomenon.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for configuring a routing path which uses location information of a terminal in a wireless communication system.

Another aspect of the present disclosure is to provide a method and apparatus for configuring a routing path by using a linear virtual line which reaches from a source terminal to a target terminal in a wireless communication system.

Yet another aspect of the present disclosure is to provide a method and apparatus for determining a point at which a virtual line and an orthogonal line cross by using a line which is from an intermediary terminal and which is orthogonal to the virtual line between a source terminal and a target terminal, and for selecting the intermediary terminal by using a distance to the point with respect to the source terminal in a wireless communication system.

Still another aspect of the present disclosure is to provide a method and apparatus for determining a region excluded in a selection of an intermediary node on the basis of a maximum speed of a terminal and for selecting a neighboring terminal not included in the region excluded in the selection of the intermediary node as the intermediary terminal in a wireless communication system.

Still another aspect of the present disclosure is to provide a method and apparatus for configuring a routing path in such a manner that, if a response message for a path configuration is received from a terminal in a wireless communication, it is determined whether the terminal which transmits the response message is identical to a terminal determined as a previous node.

In accordance with an aspect of the present disclosure, a method of a node selecting terminal for configuring a routing path is provided. The method includes measuring a first distance between the terminal and a target terminal, transmitting information of the measured first distance to at least one neighboring terminal, receiving a second distance measured for the target terminal with respect to the terminal from the at least one neighboring terminal, and determining a neighboring terminal of which the second distance is the longest as a next terminal of the routing path.

In accordance with another aspect of the present disclosure, a method of a neighboring terminal for configuring a routing path is provided. The method includes receiving from a node selecting terminal a signal including a first distance between the node selecting terminal and a target terminal, determining whether the target terminal is the neighboring terminal, when the target terminal is not the neighboring terminal, measuring a second distance to the target terminal on the basis of the node selecting terminal by using the distance information, and transmitting the second distance to the node selecting terminal.

In accordance with another aspect of the present disclosure, a node selecting terminal for configuring a routing path is provided. The node selecting terminal includes a transceiver configured to transmit and receive a signal with at least one neighboring terminal, and a controller configured to control a function for measuring a first distance between the node selecting terminal and a target terminal, to transmit the measured distance information to the at least one neighboring terminal, to receive a second distance measured for the target terminal with respect to the terminal from the at least one neighboring terminal, and to determine a neighboring terminal of which the second distance is the longest as a next terminal of the routing path.

In accordance with another aspect of the present disclosure, a neighboring terminal for configuring a routing path is provided. The neighboring terminal includes a transceiver configured to transmit and receiving a signal with at least one different terminal, and a controller configured to control a function of receiving from a node selecting terminal a signal including a first distance between the node selecting terminal and a target terminal, to determine whether the target terminal is the neighboring terminal, and if the target terminal is not the neighboring terminal, to measure a second distance to the target terminal on the basis of the node selecting terminal by using the distance information and to transmit the second distance to the node selecting terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a method and apparatus for configuring a routing path by using location information of a terminal in a wireless communication system will be described according to various embodiments of the present disclosure. In the various embodiments of the present disclosure, an intermediary node, an intermediary terminal, and a next terminal may equally refer to an intermediary node of a routing path, and these terms are interchangeably used in the following description.

Figure 1:
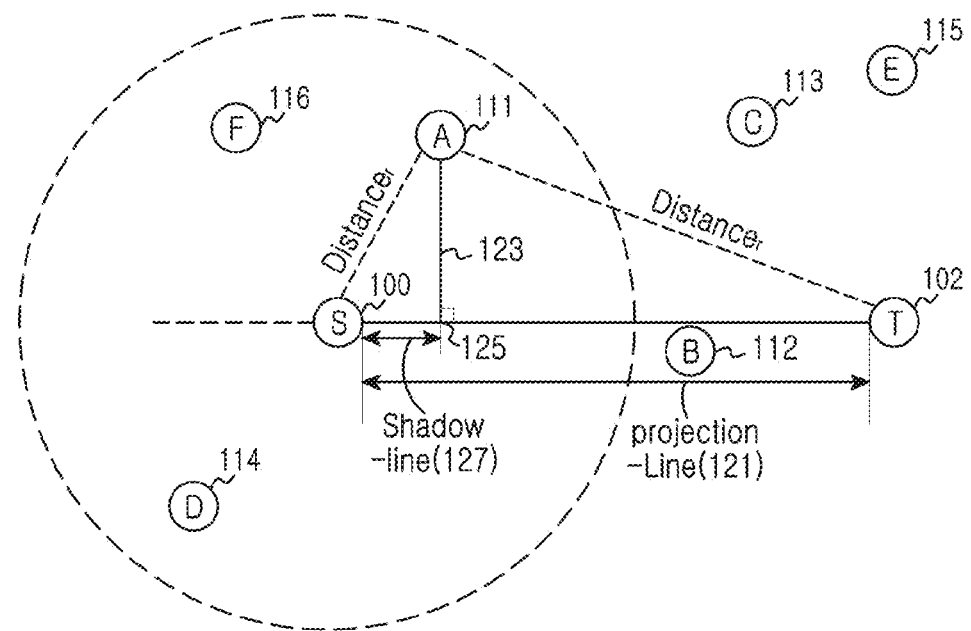
FIG. 1 illustrates a projection line and a shadow line according to an embodiment of the present disclosure.

FIG. 1 illustrates a projection line and a shadow line according to an embodiment of the present disclosure.

Referring to FIG. 1, for data transmission and reception of a source terminal S 100 and a target terminal T 102 (or a destination terminal), the present disclosure configures a routing path between the source terminal S 100 and the target terminal T 102. For this, the source terminal S 100 generates a virtual line (hereinafter, called a projection line) 121 which reaches to the target terminal 102, and calculates a length of the projection line 121. In an embodiment, the length of the projection line 121 can be calculated on the basis of location information of the source terminal S 100 and location information of the target terminal T 102. For example, the length of the projection line 121 can be calculated as shown in Equation (1) on the basis of a coordinate $(X_S, Y_S, Z_S)$ indicating a location of the source terminal S 100 and a coordinate $(X_T, Y_T, Z_T)$ indicating a location of the target terminal T 102.

$$PROJ_S = \sqrt{\{X_T - X_S\}^2 + \{Y_T - Y_S\}^2 + \{Z_T - Z_S\}^2} \quad \text{Equation (1)}$$

Herein, $PROJ_S$ denotes a length of the projection line between the source terminal S 100 and the target terminal T 102.

In addition, in the present disclosure, a terminal 111 neighboring to the source terminal S 100 generates a virtual line 123 orthogonal to the projection line 121 between the source terminal S 100 and the target terminal T 102, and calculates a distance of a line 127 (hereinafter, called a shadow line) connecting the source terminal S 100 at a point 125 at which the projection line 121 and the virtual line 123 intersect. In an embodiment, the shadow line can indicate a relative distance of a neighboring terminal to the target terminal T 102, measured with respect to the source terminal S 100. The distance of the shadow line 127 can be calculated on the basis of a projection distance, a distance between the source terminal S 100 and the neighboring terminal A 111, and a distance between the target terminal T 102 and the neighboring terminal A 111. For example, the distance of the shadow line 127 can be calculated by Equation (2) below.

$$SHAD_A = \frac{DIST_S^2 - DIST_T^2 + PROJ_S^2}{2 \times PROJ_S} \quad \text{Equation (2)}$$

Herein, $SHAD_A$ denotes a length of the shadow line 127 of the neighboring terminal A 111, $DIST_S$ denotes a distance between the neighboring terminal A 111 and the target terminal T 102, and $PROJ_S$ denotes a length of the projection line 121 which reaches from the source terminal S 100 to the target terminal 102. In an embodiment, the length of the shadow line may be a positive number or a negative number.

In the present disclosure, from among a plurality of terminals neighboring to the source terminal S 100, a neighboring terminal of which a shadow line has a greatest distance is selected as a terminal for performing a role of an intermediary node. That is, according to the embodiment of the present disclosure, from among a plurality of neighboring terminals capable of receiving a signal from the source terminal S 100, a neighboring terminal closest in distance to the target terminal T 102 may be selected as an intermediary terminal.

According to an embodiment of the present disclosure, the intermediary terminal repeatedly generates a projection line which reaches to the target terminal T 102, may calculate a length of the projection line, may calculate the length of the shadow line on the basis of the calculated length of the projection line as described above, and may select a next intermediary terminal.

Figure 2A:
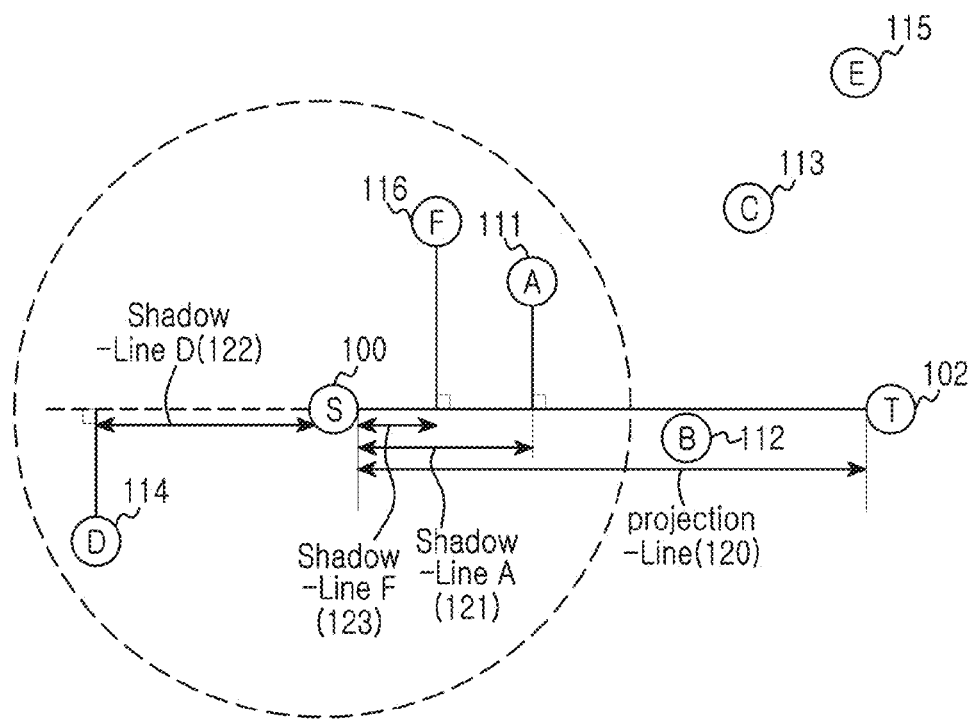
FIGS. 2A, 2B, and 2C illustrate an example of configuring a routing path on the basis of a projection line and a shadow line according to an embodiment of the present disclosure.
Figure 2B:
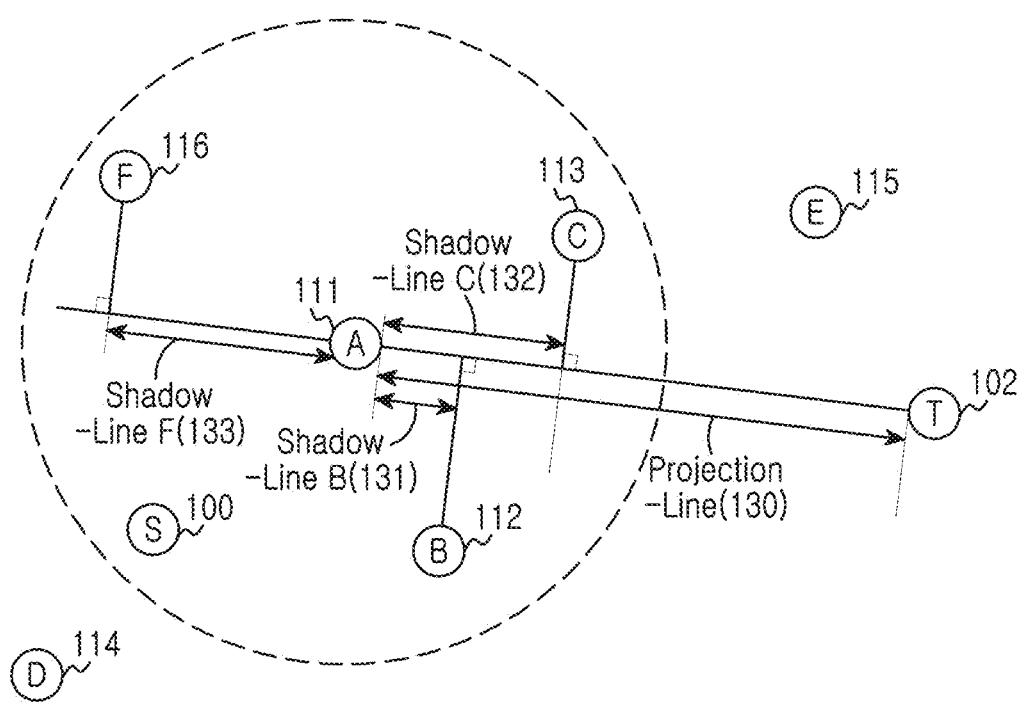
Figure 2C:
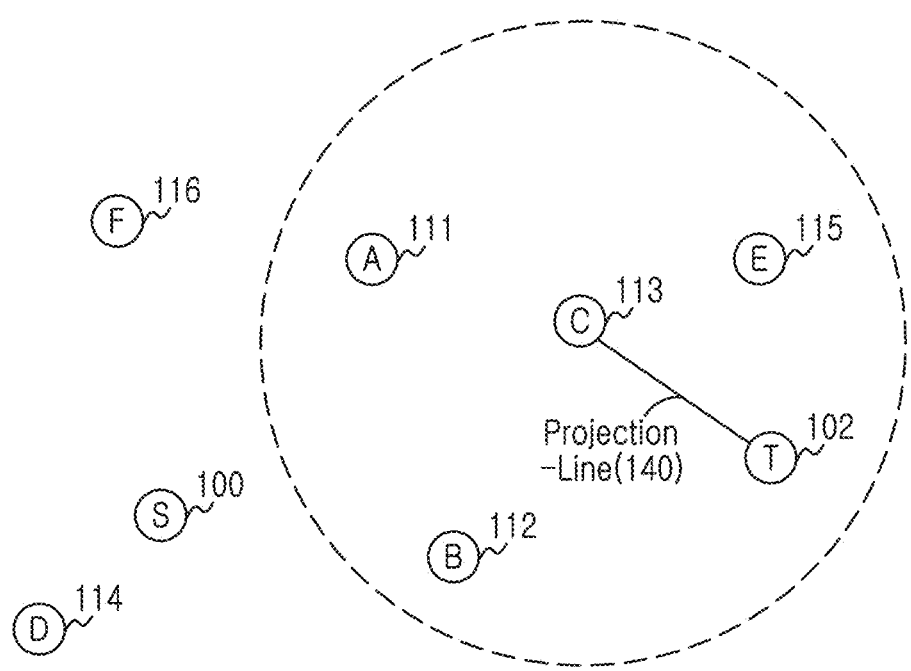

FIGS. 2A, 2B and 2C illustrate an example of configuring a routing path on the basis of a projection line and a shadow line according to an embodiment of the present disclosure.

Referring to FIGS. 2A, 2B and 2C, each terminal may change in location due to a movement.

Referring to FIG. 2A, a source terminal S 100 generates a projection line 120 which reaches from the source terminal S 100 to a target terminal T 102, and transmits length information of the projection line 120 to neighboring terminals 111, 114, and 116. Then, upon receiving the length information of the projection line 120, the neighboring terminals 111, 114, and 116 respectively calculate lengths of shadow lines 121, 122, and 123 for the projection line 120, and transmit length information of the shadow lines 121, 122, and 123 to the source terminal S 100. Then, from among the neighboring terminals 111, 114, and 116, the source terminal S 100 selects the terminal A 111 having a longest shadow line to a next node, i.e., an intermediary terminal, and reports to the terminal A 111 that it is selected as the intermediary terminal.

Referring to FIG. 2B, the terminal A 111 selected as the intermediary terminal generates a projection line 130 which reaches from the terminal A 111 to the target terminal T 102, and transmits length information of the projection line 130 to neighboring terminals 112, 113, and 116. Then, upon receiving the length information of the projection line 130, the neighboring terminals 112, 113, and 116 respectively calculate lengths of shadow lines 131, 132, and 133 for the projection line 130, and transmit length information of the shadow lines 131, 132, and 133 to the terminal A 111. Then, from among the neighboring terminals 112, 113, and 116, the terminal C 113 selects the terminal A 111 having a longest shadow line to a next node, i.e., an intermediary terminal, and reports to the terminal C 113 that it is selected as the intermediary terminal.

Referring to FIG. 2C, the terminal C 113 selected as the intermediary terminal generates a projection line 140 which reaches from the terminal C 113 to the target terminal T 102, and transmits length information of the projection line 140 to neighboring terminals 102, 111, 112, and 115. Since the target terminal T 102 exists in a coverage region of the terminal C 113, a signal for configuring a routing path can be received from the terminal C 113. Accordingly, the target terminal T 102 transmits a response signal to the terminal C 113 selected as the intermediary node. This response signal is delivered to the source terminal S 100 via the terminal A 111 and the terminal C 113 selected as the intermediary node, and thus a routing path is configured between the source terminal S 110 and the target terminal T 102.

Figure 3A:
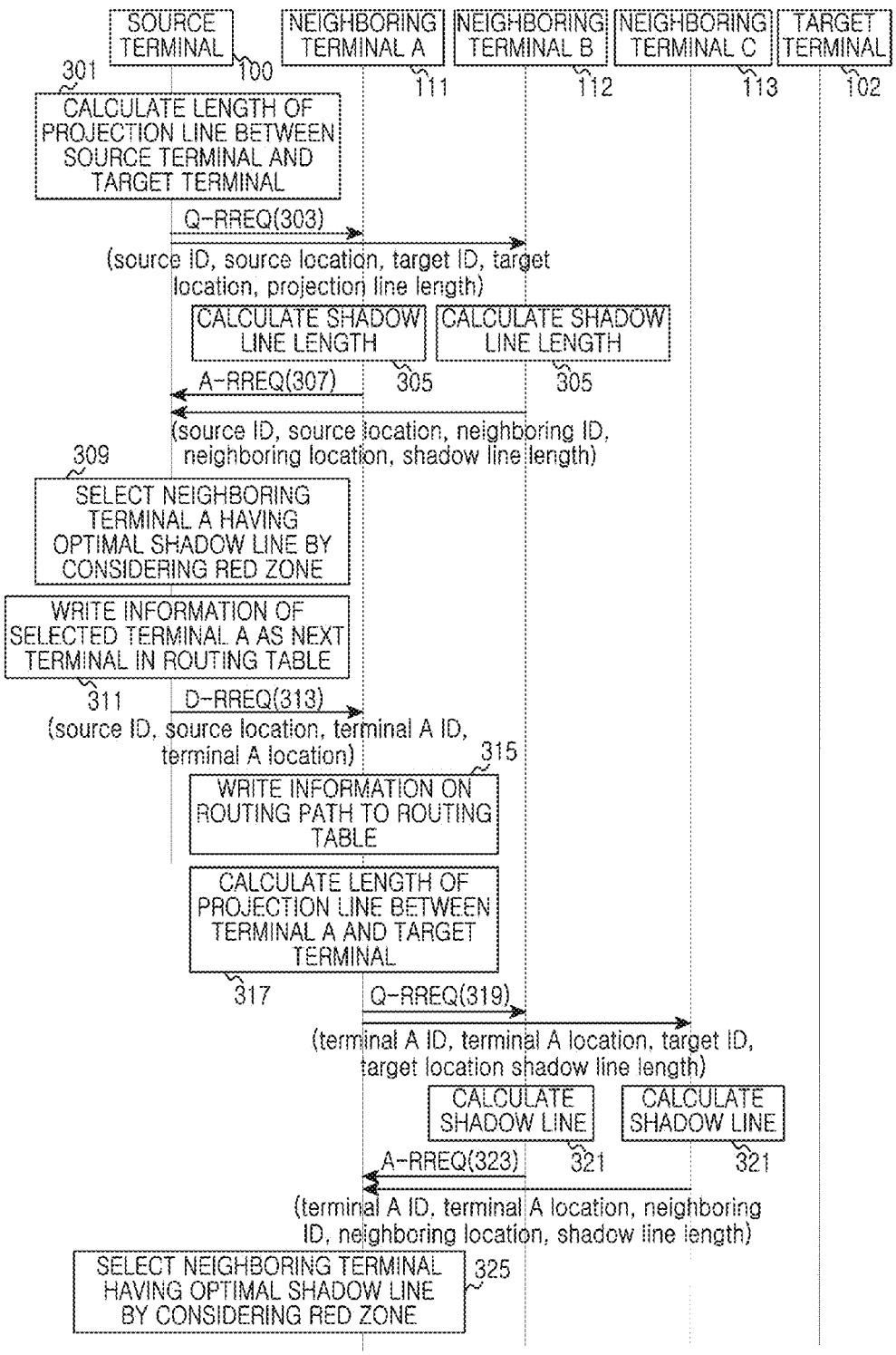
FIG. 3A and FIG. 3B illustrate a signal flow for configuring a routing path between a source terminal and a target terminal according to an embodiment of the present disclosure.
Figure 3B:
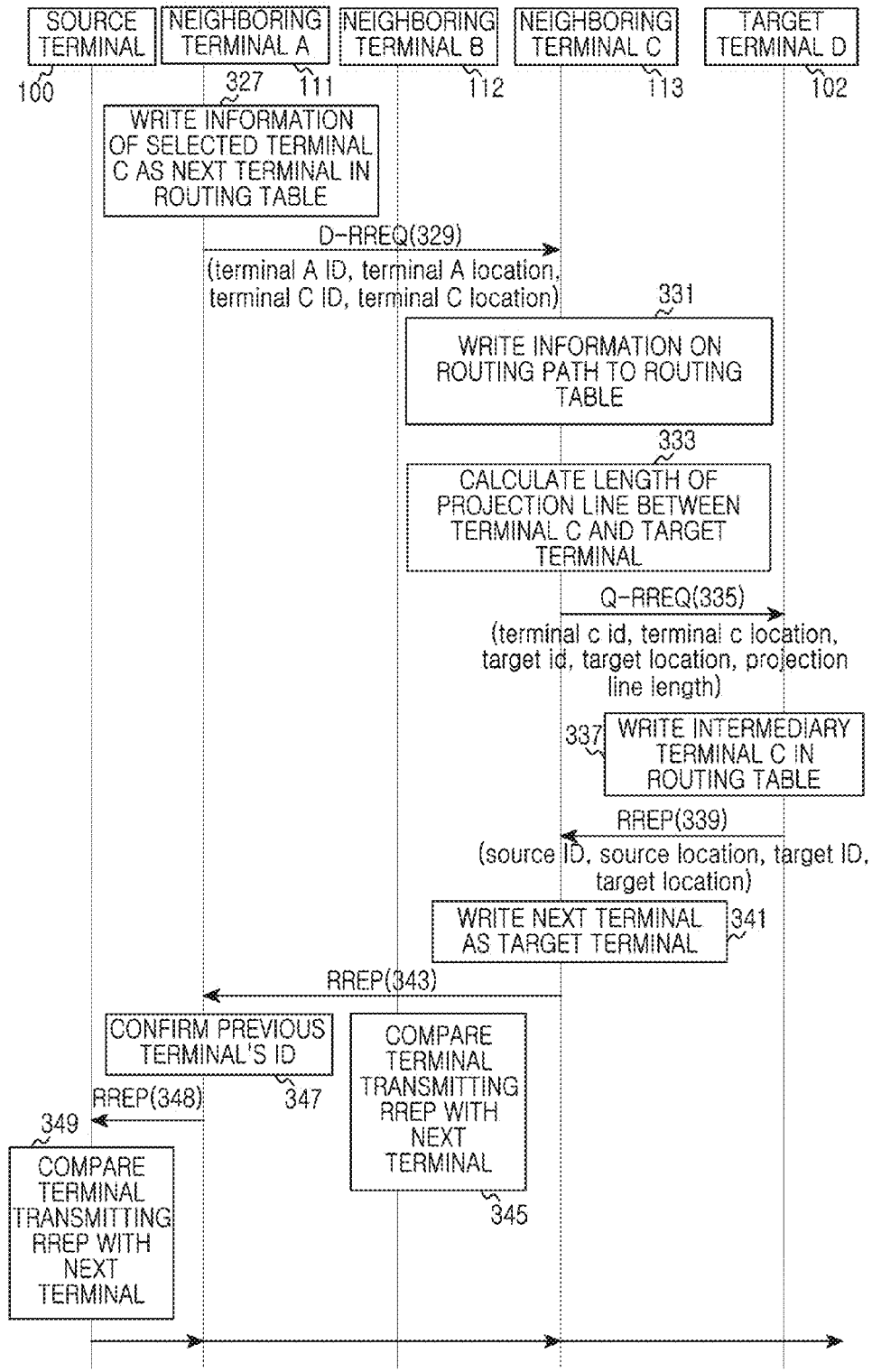

FIG. 3A and FIG. 3B illustrate a signal flow for configuring a routing path between a source terminal and a target terminal according to an embodiment of the present disclosure.

Referring to FIG. 3A and FIG. 3B, in operation 301, a source terminal 100 calculates a projection line which reaches from the source terminal 100 to a target terminal 102. In operation 303, the source terminal 100 transmits to neighboring terminals 111 and 112 a Query-Routing Request (Q-RREQ) message including the calculated length of the projection line. In this case, the Q-RREQ message includes an IDentifier (ID) and location information (or a location coordinate) of a terminal for transmitting the Q-RREQ message, an ID and location information of a target terminal, and a length of a projection line which reaches from the terminal for transmitting the Q-RREQ message to the target terminal. For example, referring to FIG. 2A, the Q-RREQ message transmitted by the source terminal S 100 includes an ID of the source terminal S 100, location information of the source terminal S 100, an ID of the target terminal T 102, location information of the target terminal T 102, and length information of the projection line 120 which reaches from the source terminal S 100 to the target terminal T 102.

Upon receiving the Q-RREQ message, in operation 305, each of the neighboring terminal A 111 and the neighboring terminal B 112 calculates a length of a shadow line by using projection line length information of the source terminal 100. For example, referring to FIG. 2A, the neighboring terminal A 111 confirms length information of the projection line 120, location information of the source terminal S 100, and location information of the target terminal T 102 from the Q-RREQ message, then calculates a distance between the source terminal S 100 and the neighboring terminal A 111 and a distance between the target terminal T 102 and the neighboring terminal A 111, and then calculates a length of the shadow line 121 by using Equation (2). In operation 307, each of the neighboring terminal A 111 and the neighboring terminal B 112 transmits to the source terminal T 100 an Acknowledgement-Routing Request (A-RREQ) message including the calculated length of the shadow line. In this case, the A-RREQ message includes an ID and location information of a terminal for transmitting the Q-RREQ message, an ID and location information of a terminal for transmitting the A-RREQ message, and the calculated length of the shadow line. For example, referring to FIG. 2A, the A-RREQ message transmitted by the terminal A 111 in response to the Q-RREQ of the source terminal S 100 includes an ID of the source terminal S 100, location information of the source terminal S 100, an ID of the neighboring terminal A 111, location information of the neighboring terminal A 111, and the length information of the shadow line 121 calculated in the neighboring terminal A 111.

Upon receiving the A-RREQ message from the neighboring terminals 111 and 112, in operation 309, the source terminal S 100 determines a red zone, and selects a neighboring terminal having an optimal shadow line as a next terminal (or an intermediary terminal) of a routing path on the basis of the determined red zone. In an embodiment, the red zone is a region which is included in a coverage region of the terminal for selecting the intermediary node and which is excluded in selection of the intermediary node, and is determined as a region having a high probability that the routing path can be broken in next data transmission by considering a speed of the terminal. That is, a region within a coverage region (or a region corresponding to the maximum transmission radius) of a terminal for selecting an intermediary node can be divided into an intermediary node non-selection region and an intermediary node selection region.

The red zone is determined on the basis of a maximum transmission radius of a terminal for selecting an intermediary node and a maximum speed of the terminal as shown in Equation (3) below.

$$R_{RED}(d)=R-r=R-v_{max} \cdot t \qquad \text{Equation (3)}$$

Herein, $R_{RED}(d)$ denotes a radius of an intermediary node selection region, and is used as a distance for determining a red zone. In addition, R denotes a maximum transmission radius of a terminal for selecting an intermediary node. In addition, r denotes a terminal movement radius per a unit time, and is determined by a terminal's maximum movement speed $v_{max}$ and a unit time t.

Figure 4:
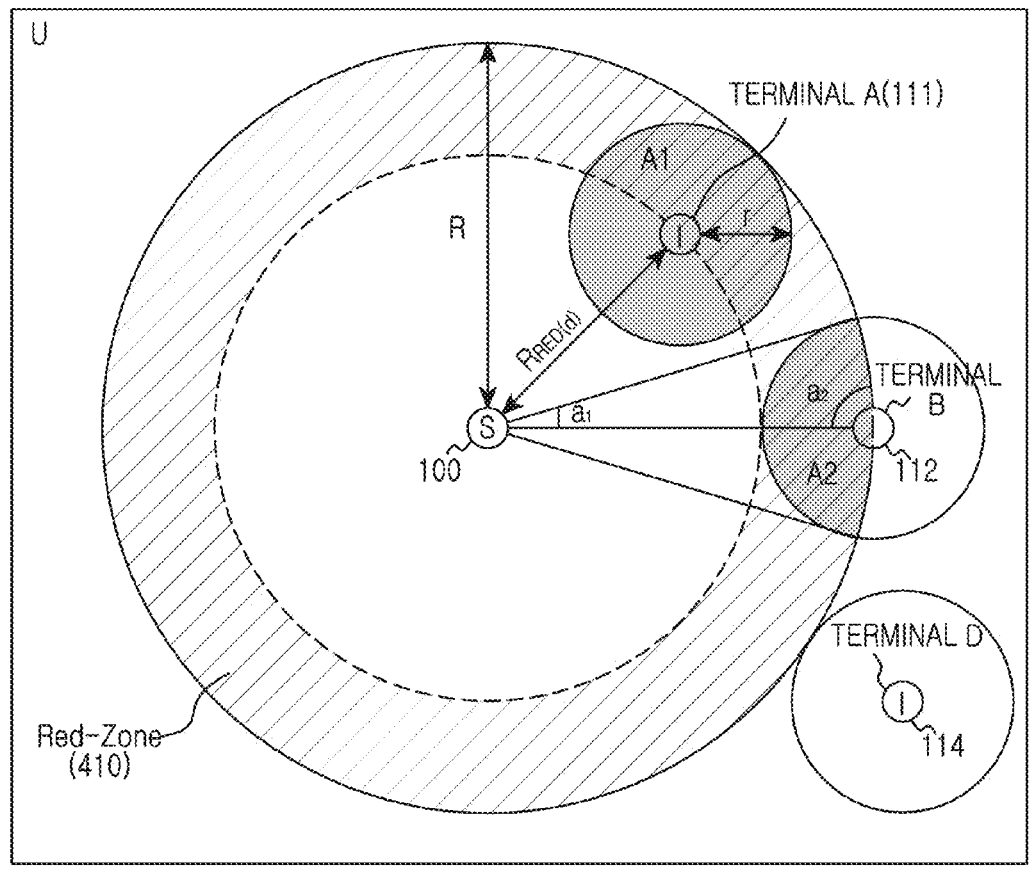
FIG. 4 illustrates a region excluded in selection of an intermediary node according to an embodiment of the present disclosure.

That is, in an embodiment of the present disclosure, as illustrated in FIG. 4, from among regions corresponding to a maximum transmission radius of the terminal, the remaining regions other than a region corresponding to $R_{RED}(d)$ determined according to Equation (3) are determined as a red zone 410 which is excluded in selection of an intermediary node. Although a neighboring terminal located in the red zone does not break the routing path in the present disclosure, it is regarded that the routing path can be broken at a next time point due to a movement of the terminal, and thus the neighboring terminal located in the red zone is excluded from a node selection target.

FIG. 4 illustrates a region excluded in selection of an intermediary node according to an embodiment of the present disclosure.

Referring to FIG. 4, if it is assumed that the red zone 410 of a source terminal 100 is determined, a region indicating a movement radius per unit time of a terminal B 112 corresponds to the red zone 410 in the coverage region of the source terminal 100, and a region indicating a movement radius per unit time of a terminal A 111 corresponds to a region other than the red zone 410 in the coverage region of the source terminal 100, then the source terminal 100 can select the terminal A 111, and not the terminal B 112, as a next node of a routing path even if a length of a shadow line of the terminal B 112 is longer than a length of a shadow line of the terminal A 111. In an embodiment, as illustrated in FIG. 4, it is apparent that a region not corresponding to a maximum transmission radius of the source terminal 100 for selecting an intermediary node is excluded from an intermediary node selection target region. Therefore, a terminal D 114, which is located out of the maximum transmission radius of the source terminal 100 for selecting the intermediary node, is also excluded from the intermediary node selection target.

In an embodiment, a region indicating a movement radius of a neighboring terminal can be directly calculated in each neighboring terminal and then can be transmitted to an intermediary node selecting terminal. When the neighboring terminal transmits only location information to the intermediary node selecting terminal, an intermediary node can be calculated in the selecting terminal.

The region indicating the movement radius of the neighboring terminal can be calculated as shown in Equation (4) below according to a distance between the neighboring terminal and the terminal for selecting the intermediary node.

$$A1=\pi r^2-\pi(v_{max} \cdot t)^2, 0<d \leq R-r$$

$$A2=\alpha_1 R^2+\alpha_2 r^2-d \cdot \sin \alpha_2, R-r<d \leq R+r$$

$$A3=0, R+r<d \qquad \text{Equation (4)}$$

Herein, r denotes a terminal movement radius per a unit time, and is determined by terminal's maximum movement speed $v_{max}$ and a unit time t. In addition, R denotes a maximum transmission radius of a terminal for selecting an intermediary node, and d denotes a distance between the source terminal S 100 for selecting an intermediary node and a neighboring terminal. In addition, $\alpha_1$ is $$\cos^{-1} \frac{d^2+R^2-r^2}{2dR},$$

and $\alpha_2$ is $$\cos^{-1} \frac{d^2+r^2-R^2}{2dr}.$$

That is, the source terminal S 100 determines neighboring terminals which have a region other than a red zone as a movement radius region from among regions corresponding to a maximum transmission radius of the intermediary terminal A 111 each as being a candidate intermediary terminal, and selects a terminal having a longest shadow line as a next terminal (or an intermediary terminal) from among the candidate intermediary terminals. Herein, it is assumed that the neighboring terminal A 111 is selected as the next terminal between the neighboring terminal A 111 and the neighboring terminal B 112.

In operation 311, the source terminal S 100 writes information of the terminal A 111 selected as the next terminal in a routing table. Herein, the routing table can include a source terminal ID, a target terminal ID, a previous terminal ID, and a next terminal ID. In this case, since a previous terminal of the source terminal S 100 does not exist, it can be written that the previous terminal ID does not exist.

In operation 313, the source terminal S 100 transmits to the neighboring terminal A 111 a Decision-Routing Request (D-RREQ) message indicating that it is selected as an intermediary terminal. In this case, the D-RREQ message includes an ID and location information (or a location coordinate) of the terminal S 110 for transmitting the D-RREQ message and an ID and location information of the terminal A 111 selected as the intermediary terminal.

In operation 315, the terminal A 111 selected as the intermediary terminal writes information on a routing path to its routing table. Herein, the routing table can include a source terminal ID, a target terminal ID, a previous terminal ID, and a next terminal ID. For example, the terminal A 111 can write to its routing table an ID of the terminal S 100 as an ID of a source terminal, an ID of the terminal T 102 as an ID of a target terminal, and an ID of the source terminal S 100 as an ID of a previous terminal.

In operation 317, the intermediary terminal A 111 calculates a length of a projection line which reaches from the intermediary terminal A 111 to the target terminal 102. In operation 319, the intermediary terminal A 111 transmits a Q-RREQ message including the calculated length of the projection line to the neighboring terminals 112 and 113. In an embodiment, as illustrated in FIG. 2B, the Q-RREQ message transmitted by the intermediary terminal A 111 includes an ID of the intermediary terminal A 111, location information of the intermediary terminal A 111, an ID of the target terminal T 102, location information of the target terminal T 102, and length information of the projection line 130 which reaches from the intermediary terminal A 111 to the target terminal T 102.

In operation 321, upon receiving the Q-RREQ message, the neighboring terminal B 112 and the neighboring terminal C 113 calculate a length of a shadow line by using projection line length information of the intermediary terminal A 111. For example, referring to FIG. 2B, the neighboring terminal B 112 confirms length information of the projection line 130, location information of the intermediary terminal A 111, and location information of the target terminal T 102 from the Q-RREQ message, thereafter calculates a distance between the intermediary terminal A 111 and the neighboring terminal B 112 and a distance between the target terminal T 102 and the neighboring terminal B 112, and thereafter calculates a length of the shadow line 131 as illustrated in Equation (2). In operation 323, the neighboring terminal B 112 and the neighboring terminal C 113 transmit an A-RREQ message including the calculated length of the shadow line to the intermediary terminal A 111. In this case, the A-RREQ message includes an ID and location information of a terminal which transmits the Q-RREQ message, an ID and location information of a terminal which transmits the A-RREQ message, and the calculated length of the shadow line. For example, referring to FIG. 2B, the A-RREQ message transmitted by the terminal B 112 in response to the Q-RREQ of the intermediary terminal A 111 includes an ID of the intermediary terminal A 111, location information of the intermediary terminal A 111, an ID of the neighboring terminal B 112, location information of the neighboring terminal B 112, and length information of the shadow line 131 calculated in the neighboring terminal B 112.

Upon receiving the A-RREQ message from the neighboring terminals 112 and 114, in operation 325, the intermediary terminal A 111 determines a red zone, and selects a neighboring terminal having an optimal shadow line as a next terminal (or an intermediary terminal) of a routing path on the basis of the determined red zone. In an embodiment, the red zone is a region which is included in a coverage of the terminal A for selecting the intermediary node and which is excluded in selection of the intermediary node, and is determined as a region having a high probability that the routing path can be broken in next data transmission by considering a speed of the terminal That is, the intermediary terminal A 111 determines neighboring terminals, which have a region other than a red zone as a movement radius region from among regions corresponding to a maximum transmission radius of the intermediary terminal A 111, as a candidate intermediary terminal on the basis of the red zone determined by using Equation (3) and a region indicating a movement radius of each neighboring terminal determined by Equation (4), and thereafter selects a terminal having a longest shadow line as a next terminal (or an intermediary terminal) from among the candidate intermediary terminals. Herein, it is assumed that the neighboring terminal C 113 is selected as the next terminal between the neighboring terminal B 112 and the neighboring terminal C 113.

In operation 327, the intermediary terminal A 111 writes information of the terminal C 113 selected as the next terminal in the routing table. In an embodiment, the intermediary terminal A 111 additionally writes an ID of the next terminal, i.e., an ID of the terminal C 113, in the routing table written in the aforementioned operation 315.

In operation 329, the intermediary terminal A 111 transmits to the neighboring terminal C 113 a D-RREQ message indicating that it is selected as the intermediary terminal. In this case, the D-RREQ message includes an ID and location information (or a location coordinate) of the terminal A 111 for transmitting the D-RREQ message and an ID and location information of the terminal C 113 selected as the intermediary terminal.

In operation 331, the terminal C 113 selected as the intermediary terminal writes information on a routing path to its routing table. In an embodiment, the routing table can include a source terminal ID, a target terminal ID, a previous terminal ID, and a next terminal ID. For example, the terminal C 113 can write to its routing table an ID of the terminal A 111 as an ID of a source terminal, an ID of the terminal T 102 as an ID of a target terminal, and an ID of the source terminal S 100 as an ID of a previous terminal.

In operation 333, the intermediary terminal C 113 calculates a length of a projection line which reaches from the intermediary terminal C 113 to the target terminal 102. In operation 335, the intermediary terminal C 113 transmits a Q-RREQ message including a length of a projection line to neighboring terminals. In an embodiment, as illustrated in FIG. 2C, the Q-RREQ message transmitted by the intermediary terminal C 113 includes an ID of the intermediary terminal C 113, location information of the intermediary terminal C 113, an ID of the target terminal T 102, location information of the target terminal T 102, and length information of the projection line 140 which reaches from the intermediary terminal C 113 to the target terminal T 102.

In an embodiment, the target terminal T 102 which receives the Q-RREQ message confirms that its own ID is identical to an ID of a target terminal of the received Q-RREQ message, determines whether the received Q-RREQ message is for configuring a routing path of the source terminal S 100 and the target terminal T 102. In operation 337, the target terminal T 102 writes the intermediary terminal C 113 which transmits the Q-RREQ to a routing table. In an embodiment, the routing table may include a source terminal ID, a target terminal ID, a previous terminal ID, and a next terminal ID. For example, the target terminal T 102 may write to its own routing table an ID of the terminal S 100 as an ID of a source terminal, an ID of the terminal T 102 as an ID of a target terminal, and the intermediary terminal C 113 as an ID of a previous terminal. In this case, since the target terminal T 102 is a final destination of data transmitted by the source terminal S 100, it may be written that the next terminal does not exist.

In operation 339, the target terminal T 102 transmits a Routing Response (RREP) message to the intermediary terminal C 113 which is a previous terminal. In an embodiment, the RREP message may include an ID of a source terminal, location information of the source terminal, an ID of a target terminal, and location information of the target terminal. In operation 341, the intermediary terminal C 113 which receives the RREP message writes a next terminal as the target terminal T 102. That is, the intermediary terminal C 113 may additionally write the ID of the target terminal T 102 to an ID of a next terminal of the routing table written in operation 321. In operation 343, the intermediary terminal C 113 confirms the previous terminal's ID written in the routing table and delivers the RREP message to the intermediary terminal A 111, which is a previous terminal.

Thereafter, the intermediary terminal A 111 confirms an ID of a terminal which transmits the RREP message. In operation 345, the intermediary terminal A compares an ID of the terminal which transmits the RREP message with a next terminal's ID written in the routing table. If the ID of the terminal C 113 which transmits the RREP message is not identical to the next terminal's ID written in the routing table, then the intermediary terminal A 111 determines that an error occurs in the routing path, and returning to operation 319, repeats an operation for selecting the next terminal again. If the ID of the terminal which transmits the RREP message is identical to the next terminal's ID written in the routing table, the intermediary terminal A 111 finally determines the terminal C 113 as a next terminal of the intermediary terminal A 111. In operation 347, the intermediary terminal A 111 confirms the previous terminal's ID written in the routing table. In operation 348, the intermediary terminal A 111 delivers the RREP message to the source terminal S 100 which is a previous terminal.

The source terminal S 100 which receives the RREP message confirms an ID of a terminal which transmits the RREP message. In operation 349, the source terminal S 100 compares an ID of the terminal which transmits the RREP message with a next terminal's ID written in the routing table. If the ID of the terminal A 111 which transmits the RREP message is not identical to the next terminal's ID written in the routing table, the source terminal S 100 determines that an error occurs in the routing path, and returning to operation 303, repeats an operation for selecting the next terminal again. If the ID of the terminal which transmits the RREP message is identical to the next terminal's ID written in the routing table, the source terminal S 100 finally determines the terminal A 111 as a next terminal, and determines that the configuration of the routing path is complete. Next, the source terminal S 100 transmits data, which is to be transmitted to the target terminal T 102, through the routing path.

In an embodiment, if the routing path is configured, intermediary terminals of the routing path may have only information of a previous terminal which will receive data and a next terminal which will transmit data, without having to have information on the entirety of the routing path.

Figure 5A:
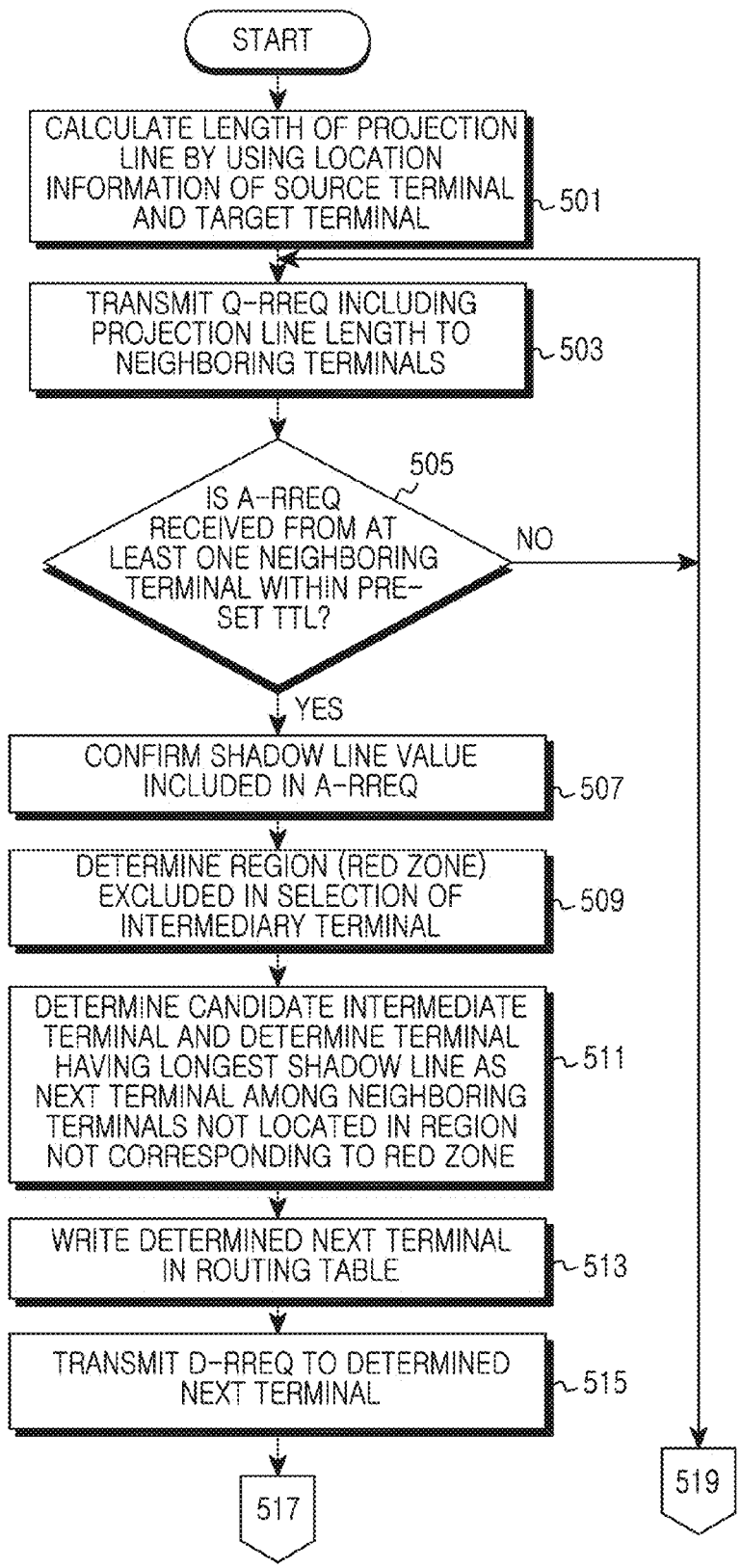
FIG. 5A and FIG. 5B illustrate a process of a source terminal for configuring a routing path according to an embodiment of the present disclosure.
Figure 5B:
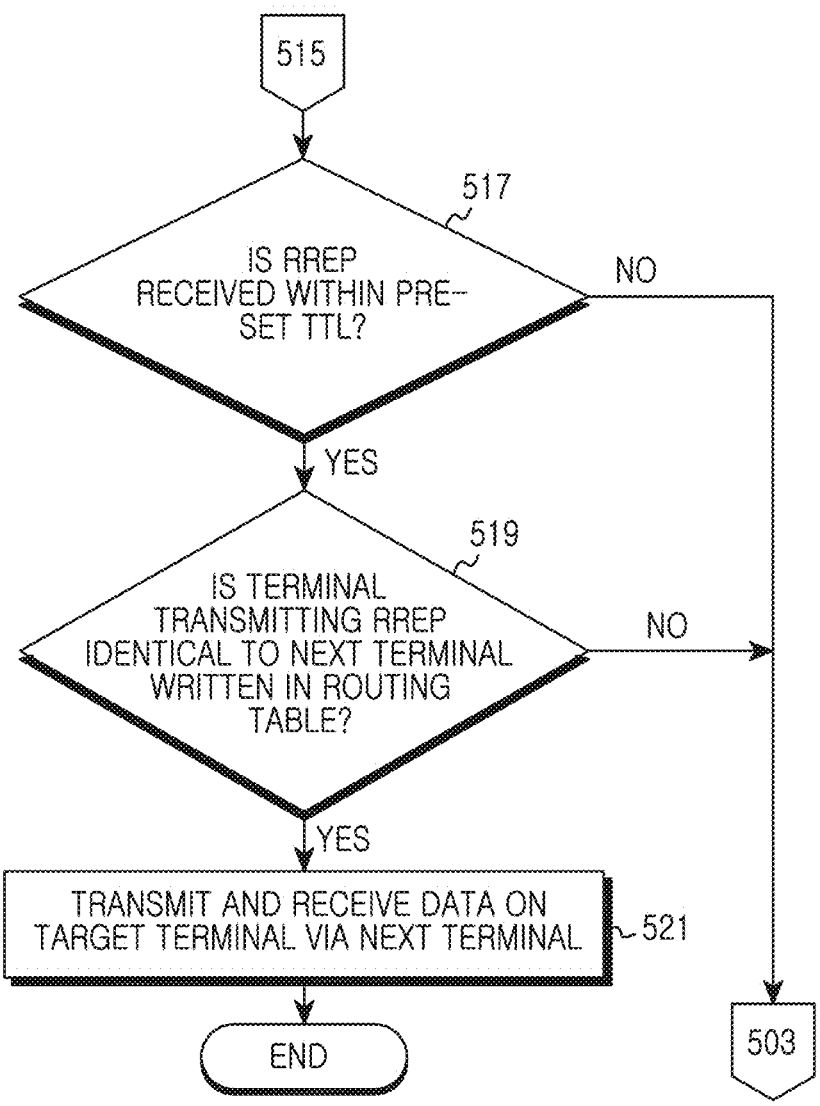

FIG. 5A and FIG. 5B illustrate a process of a source terminal for configuring a routing path according to an embodiment of the present disclosure.

Referring to FIG. 5A and FIG. 5B, in operation 501, the source terminal calculates a length of a projection line which reaches from the source terminal to a target terminal. In an embodiment, the length of the projection line can be calculated as shown in Equation (1) by using location information (or a coordinate) of the source terminal and location information of the target terminal.

In operation 503, the source terminal transmits a Q-RREQ message including the length of the projection line to neighboring terminals. In this case, the Q-RREQ message includes an ID and location information (or a location coordinate) of the source terminal, an ID and location information of the target terminal, and the length of the projection line which reaches from the source terminal to the target terminal.

In operation 505, the source terminal determines whether an A-RREQ message is received from at least one neighboring terminal within a pre-set Time to Live (TTL). If the A-RREQ is not received from the at least one neighboring terminal within the pre-set TTL, returning to operation 503, the source terminal retransmits the Q-RREQ message.

If the A-RREQ message is received from the at least one neighboring terminal within the pre-set TTL, proceeding to operation 507, the source terminal confirms a shadow line value of a corresponding neighboring terminal, included in the received A-RREQ message.

In operation 509, the source terminal determines a red zone indicating a region excluded in selection of an intermediary terminal. In operation 511, the source terminal determines a candidate intermediate terminal to neighboring terminals which are located within a maximum transmission radius of the source terminal from among neighboring terminals for transmitting the A-RREQ and which are not located in a region not corresponding to the red zone, and determines a next terminal (or an intermediary terminal) to be a terminal having a longest shadow line from among the candidate intermediary terminals. In an embodiment, as shown in Equation (3) above, the red zone of the source terminal is determined by using a maximum transmission radius of the source terminal and a terminal movement radius per a unit time. In addition, whether the neighboring terminal is located within the maximum transmission radius of the source terminal and is not located in a region not corresponding to the red zone can be determined by using a region indicating a movement radius of each neighboring terminal as shown in Equation (4) above. In this case, the region indicating the movement radius of each neighboring terminal can be directly calculated in a corresponding neighboring terminal, and can also be calculated in the source terminal That is, the source terminal can divide a region corresponding to the maximum transmission radius of the source terminal into an intermediary terminal non-selection region (i.e., a red zone) and an intermediary terminal selection region, and can determine a candidate intermediary terminal to neighboring terminals located in the intermediary terminal selection region.

In operation 513, the source terminal writes a next terminal in the routing table. In an embodiment, the routing table of the source terminal can include a source terminal ID, a target terminal ID, a previous terminal ID, and a next terminal ID. In this case, since a previous terminal of the source terminal S 100 does not exist, it can be written that the previous terminal ID does not exist.

In operation 515, the source terminal transmits to a next terminal a D-RREQ message indicating that it is selected as an intermediary terminal. In this case, the D-RREQ message includes an ID and location information (or a location coordinate) of the terminal for transmitting the D-RREQ message and an ID and location information of the neighboring terminal selected as the intermediary terminal.

In operation 517, the source terminal determines whether an RREP message is received within a pre-set TTL. If the RREP message is not received within the pre-set TTL, the source terminal determines that the routing path is broken, and returning to operation 503, retransmits the Q-RREQ message to neighboring terminals to re-select a next terminal. In an embodiment, the pre-set TTL can be measured with respect to a time at which the D-RREQ message is transmitted, and can be set to a size different from that of the TTL in operation 505.

If the RREP message is received within the pre-set TTL, proceeding to operation 519, the source terminal determines whether a terminal which transmits the RREP message is identical to a next terminal written in the routing table. If the terminal which transmits the RREP message is not identical to the next terminal written in the routing table, the source terminal determines that the routing path is broken, and returning to operation 503, retransmits the Q-RREQ message to neighboring terminals to re-select a next terminal.

If the terminal which transmits the RREP message is identical to the next terminal written in the routing table, the source terminal determines that the configuration of the routing path is complete, and proceeding to operation 521, transmits and receives data for the target terminal to and from the next terminal. In this case, the data transmitted to the next terminal is transmitted to the target terminal via the routing path.

Thereafter, the procedure of FIG. 5 ends.

Figure 6A:
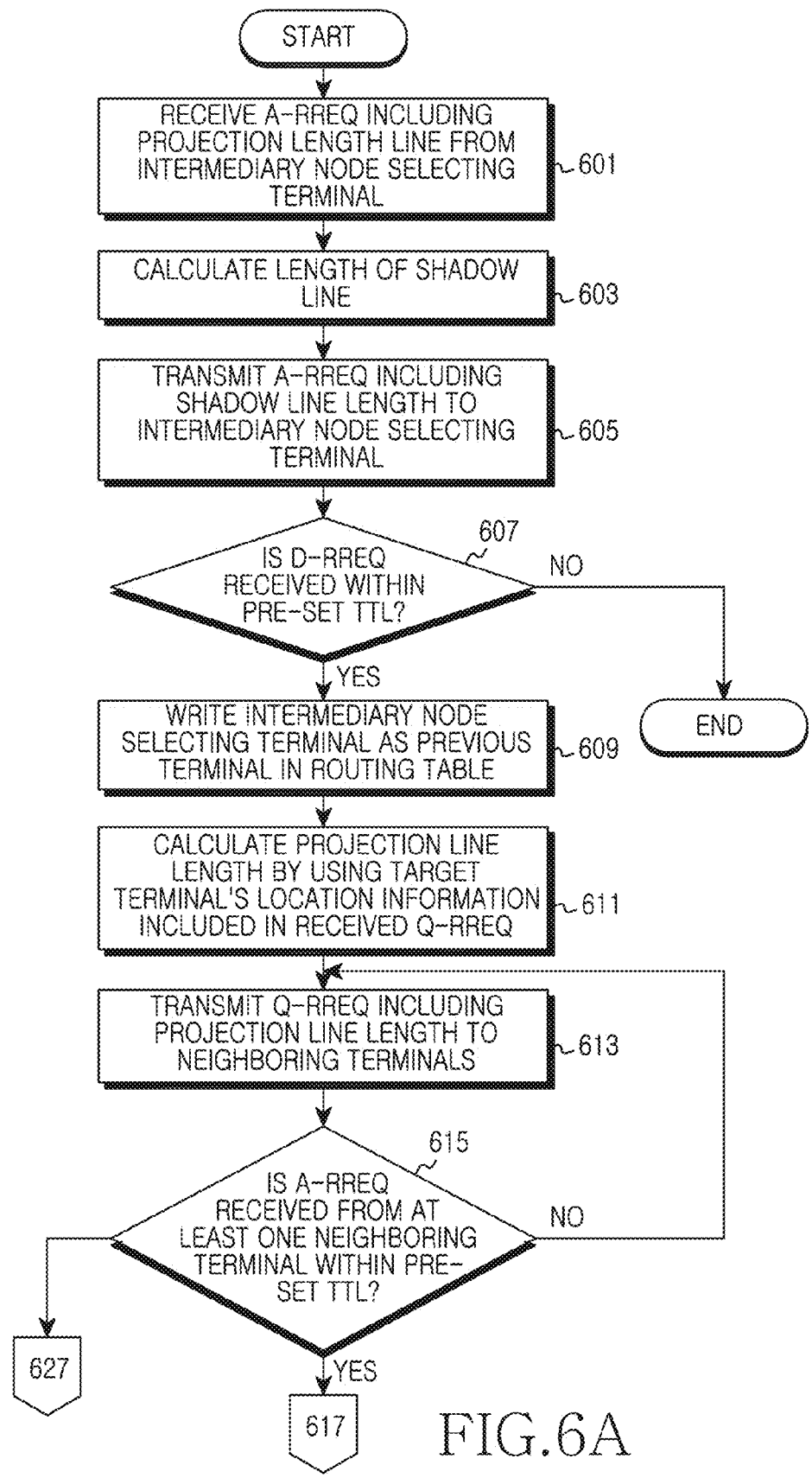
FIGS. 6A, 6B, and 6C illustrate a process of an intermediary terminal for configuring a routing path according to an embodiment of the present disclosure.
Figure 6B:
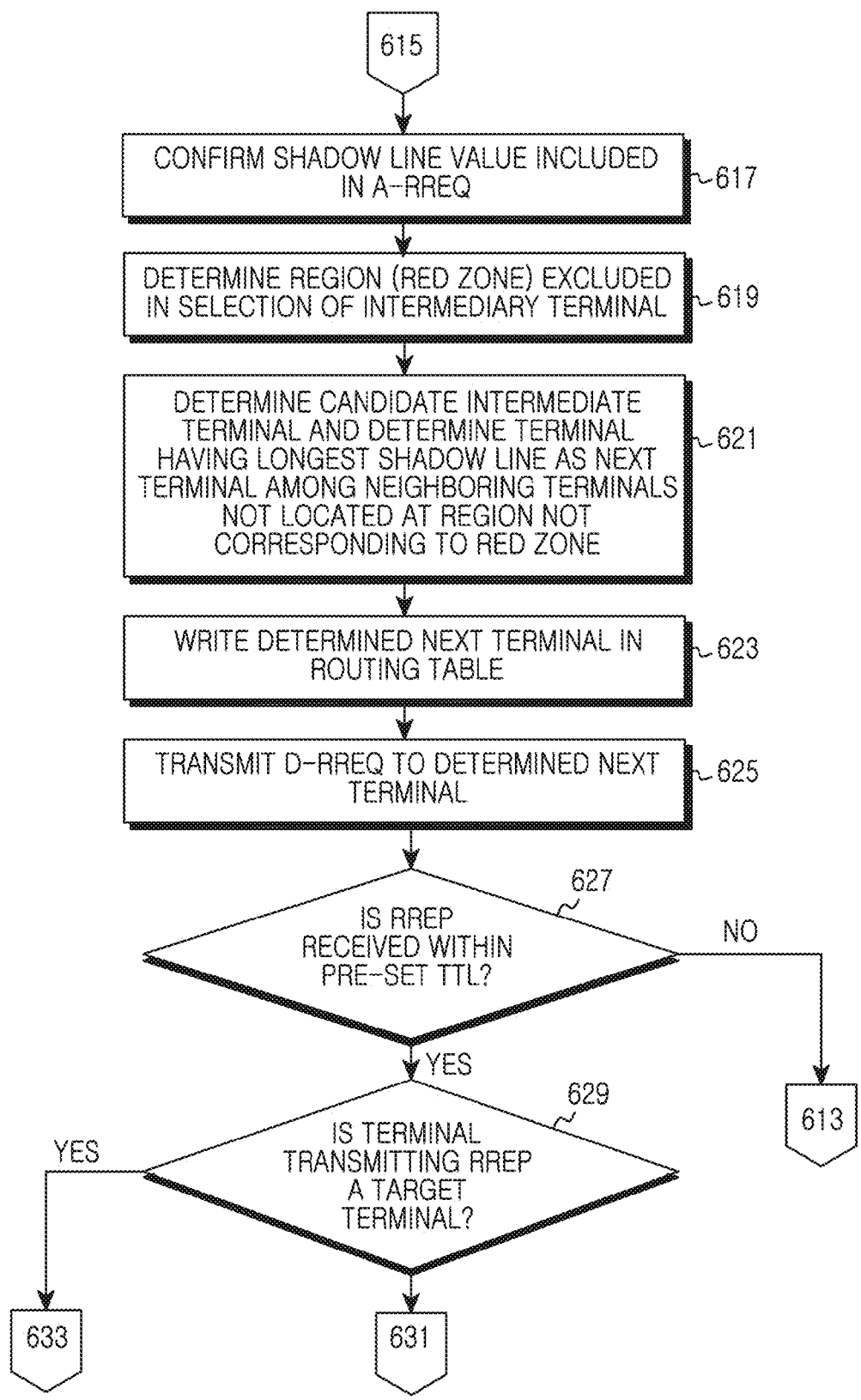
Figure 6C:
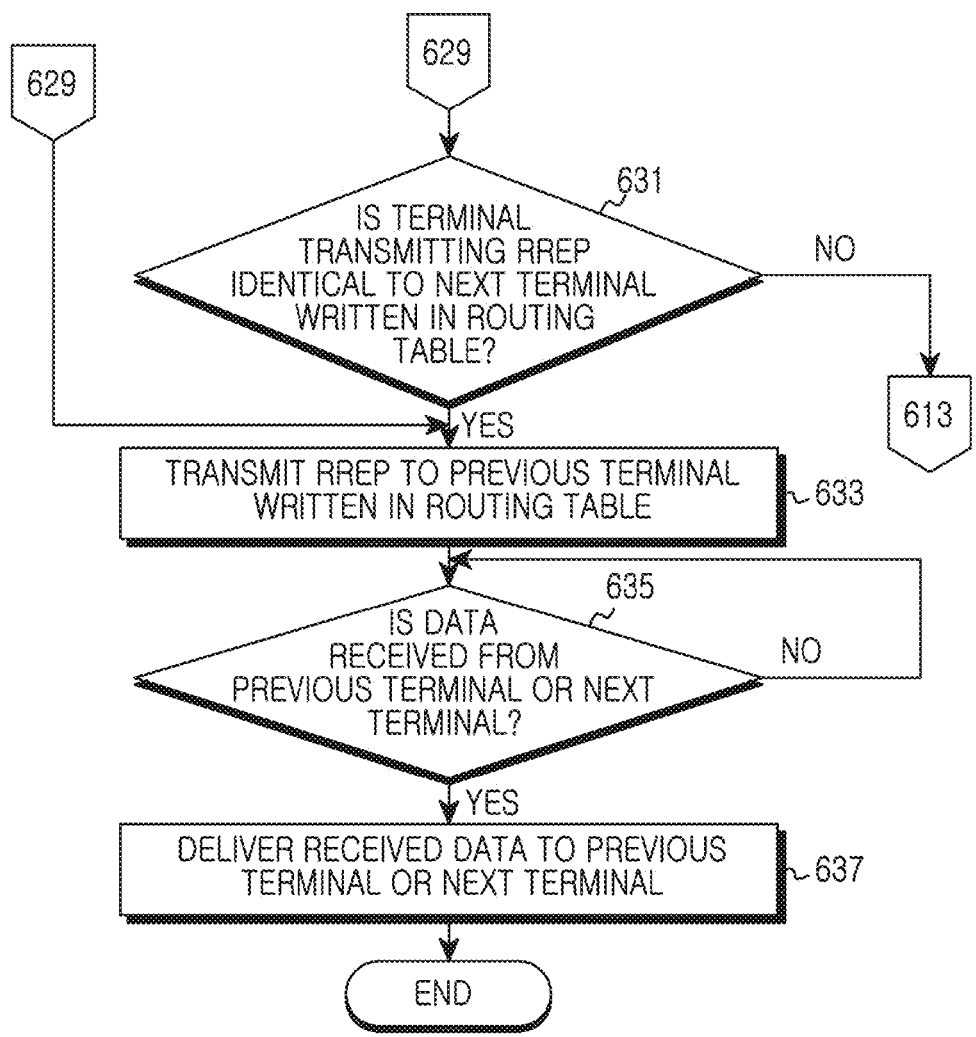

FIGS. 6A 6B and 6C illustrate a process of an intermediary terminal for configuring a routing path according to an embodiment of the present disclosure.

Referring to FIGS. 6A 6B and 6C, in operation 601, the intermediary terminal receives a Q-RREQ message including a projection line length from an intermediary node selecting terminal. In this case, the intermediary terminal can receive the Q-RREQ message from a source terminal which intends to configure the rouging path, and can receive the Q-RREQ message from the intermediary terminal Herein, for convenience of explanation, the terminal which transmits the Q-RREQ message is called the intermediary node selecting terminal.

In operation 603, the intermediary terminal calculates a length of a shadow line by using projection line length information included in the Q-RREQ message. In this case, the length information of the shadow line can be calculated as shown in Equation (2) above by using projection line length information, a location of the intermediary node selecting terminal, and location information of the target terminal.

In operation 605, the intermediary terminal transmits an A-RREQ message including the length of the shadow line to the intermediary node selecting terminal. In operation 607, the intermediary terminal determines whether a D-RREQ message is received within a pre-set TTL. In an embodiment, the pre-set TTL can be measured with respect to an A-RREQ message transmission time. If the D-RREQ message is not received within the pre-set TTL, the procedure of FIG. 6 ends.

If the D-RREQ message is received within the pre-set TTL, the intermediary terminal determines that it is selected as the intermediary node. In operation 609, the intermediary terminal writes an intermediary node selecting terminal which transmits the D-RREQ message in the routing table as a previous terminal. In addition, the intermediary terminal writes a source terminal ID and a target terminal ID in the routing table.

In operation 611, the intermediary terminal calculates a length of a projection line which reaches from the intermediary terminal to the target terminal on the basis of target terminal's location information included in the Q-RREQ message. In an embodiment, the length of the projection line can be calculated as shown in Equation (1) by using location information (or a coordinate) of the intermediary terminal and location information of the target terminal.

In operation 613, the intermediary terminal transmits a Q-RREQ message including the length of the projection line to neighboring terminals. In this case, the Q-RREQ message includes an ID and location information (or a location coordinate) of the intermediary terminal, an ID and location information of the target terminal, and the length of the projection line which reaches from the intermediary terminal to the target terminal. In addition, the Q-RREQ message can include an ID of the source terminal.

In operation 615, the intermediary terminal determines whether an A-RREQ message is received from at least one neighboring terminal within a pre-set TTL. If the A-RREQ is not received from the at least one neighboring terminal within the pre-set TTL, the procedure proceeds to operation 627.

If the A-RREQ message is received from the at least one neighboring terminal within the pre-set TTL, proceeding to operation 617, the intermediary terminal confirms a shadow line value of a corresponding neighboring terminal, included in the received A-RREQ message. In operation 619, the intermediary terminal determines a red zone indicating a region excluded in selection of an intermediary terminal. In operation 621, the intermediary terminal determines a candidate intermediate terminal to neighboring terminals which are located within a maximum transmission radius of the intermediary terminal from among neighboring terminals for transmitting the A-RREQ and which are not located in a region not corresponding to the red zone, and determines a next terminal (or an intermediary terminal) to a terminal having a longest shadow line from among the candidate intermediary terminals. In an embodiment, as shown in Equation (3) above, the red zone of the intermediary terminal is determined by using a maximum transmission radius of the intermediary terminal and a terminal movement radius per a unit time. In addition, whether the neighboring terminal is located within the maximum transmission radius of the intermediary terminal and is not located in a region not corresponding to the red zone can be determined by using a region indicating a movement radius of each neighboring terminal as shown in Equation (4) above. In this case, the region indicating the movement radius of each neighboring terminal can be directly calculated in a corresponding neighboring terminal, and can also be calculated in the intermediary terminal.

In operation 623, the intermediary terminal writes a next terminal in the routing table. That is, the intermediary terminal can additionally write a next terminal ID in the routing table written in the aforementioned operation 609.

In operation 625, the intermediary terminal transmits to the next terminal a D-RREQ message indicating that it is selected as the intermediary terminal. In this case, the D-RREQ message includes an ID and location information (or a location coordinate) of a terminal which transmits the D-RREQ message and an ID and location information of a neighboring terminal selected as the intermediary terminal. In an embodiment, the D-RREQ message can include an ID of the source terminal.

In operation 627, the intermediary terminal determines whether an RREP message is received within a pre-set TTL. If the RREP message is not received within the pre-set TTL, the intermediary terminal determines that the routing path is broken, and returning to operation 613, retransmits the Q-RREQ message to neighboring terminals to re-select a next terminal. In an embodiment, the pre-set TTL can be measured with respect to a time at which the D-RREQ message is transmitted, and can be set to a size different from that of the TTL in operation 615.

If the RREP message is received within the pre-set TTL, proceeding to operation 629, the intermediary terminal determines whether a terminal which transmits the RREP message is a target terminal. If it is the target terminal, directly proceeding to operation 633, the intermediary terminal transmits a response message to a previous terminal written in the routing table. In this case, the intermediary terminal can write an ID of the target terminal in the routing table as an ID of a next terminal.

If the terminal which transmits the RREP message is not the target terminal, proceeding to operation 631, the intermediary terminal determines whether a terminal which transmits the RREP message is identical to the next terminal written in the routing table. If the terminal which transmits the RREP message is not identical to the next terminal written in the routing table, the intermediary terminal determines that the routing path is broken, and returning to operation 613, retransmits the Q-RREQ message to neighboring terminals to re-select a next terminal.

If the terminal which transmits the RREP message is identical to the next terminal written in the routing table, the intermediary terminal determines that the configuration of the routing path is complete, and proceeding to operation 633, transmits the RREP message to the previous terminal written in the routing table.

In operation 635, the intermediary terminal determines whether data is received from the previous terminal or the next terminal. If the data is received, proceeding to operation 637, the intermediary terminal delivers the data to the previous terminal or next terminal written in the routing table.

Thereafter, the procedure of FIG. 6 ends.

Figure 7:
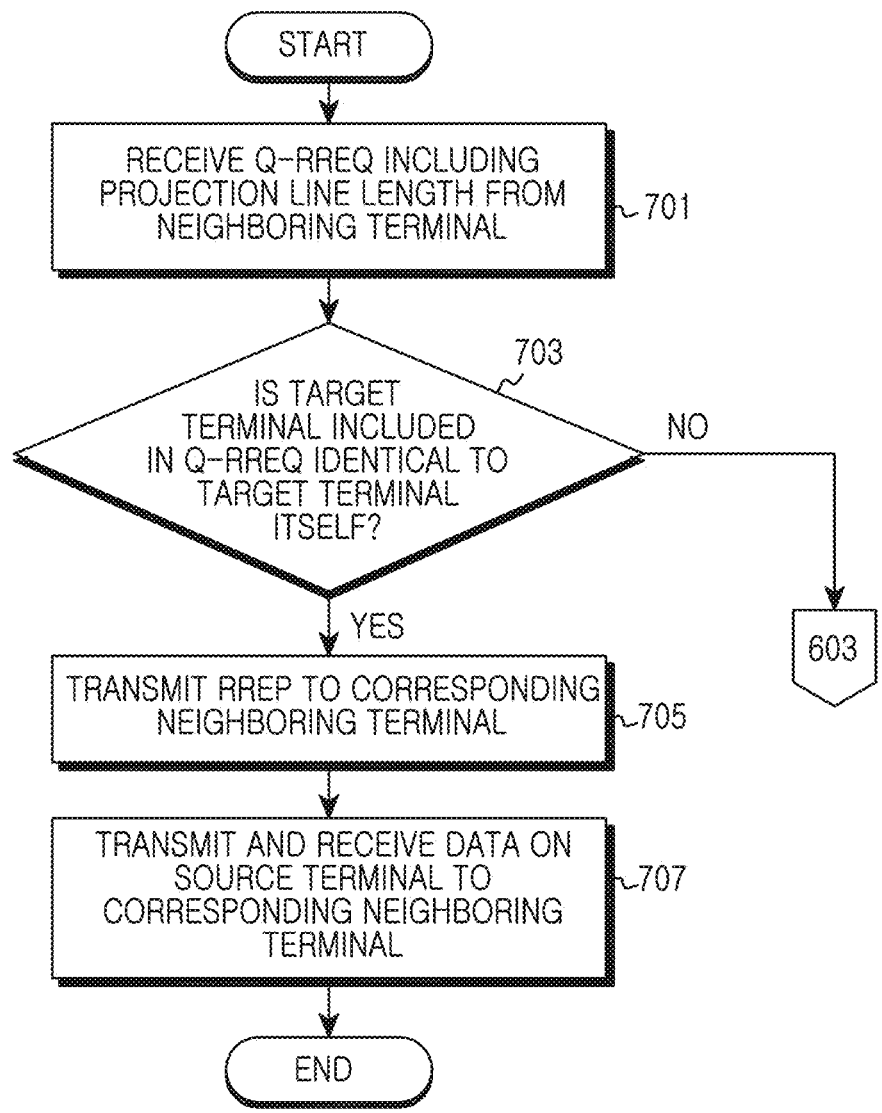
FIG. 7 is a flowchart illustrating a process of a target terminal for configuring a routing path according to an embodiment of the present disclosure.

FIG. 7 is a flowchart illustrating a process of a target terminal for configuring a routing path according to an embodiment of the present disclosure.

Referring to FIG. 7, the target terminal receives a Q-RREQ message including a projection line length from a neighboring terminal in operation 701, and compares whether its ID is equal to a target terminal's ID included in the Q-RREQ message in operation 703. If its ID is not identical to the target terminal's ID included in the Q-RREQ message, proceeding to operation 603, the target terminal performs the subsequent steps.

If its ID is identical to the target terminal's ID included in the Q-RREQ message, proceeding to operation 705, the target terminal transmits an RREP message to a corresponding neighboring terminal Thereafter, the target terminal and receives data from a source terminal to the neighboring terminal in operation 707, and then the procedure of FIG. 7 ends.

Although it is described above that the RREP message is transmitted one time, the target terminal can periodically transmit the RREP message to determine whether the routing path is maintained. In this case, if the RREP message is not received periodically from a next terminal, the source terminal and intermediary terminals of the routing path can transmit a Routing Error (RRER) message to the next terminal to request retransmission of the RREP message, or can perform an operation for determining that an error occurs in the routing path and retransmitting a Q-RREQ message to reconfigure the routing path.

Figure 8:
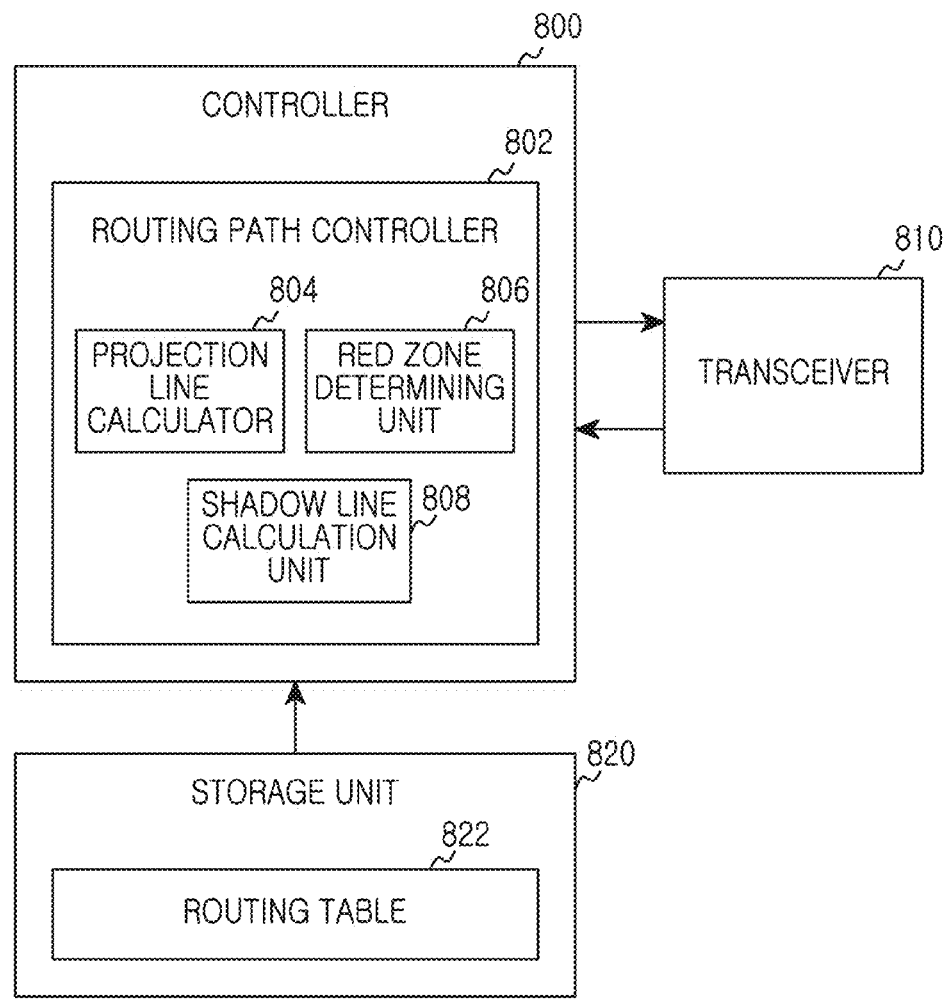
FIG. 8 is a block diagram illustrating a structure of a terminal for configuring a routing path according to an embodiment of the present disclosure.

FIG. 8 is a block diagram illustrating a structure of a terminal for configuring a routing path according to an embodiment of the present disclosure.

Referring to FIG. 8, the terminal includes a controller 800, a transceiver 810, and a storage unit 820. In particular, the controller 800 includes a routing path controller 802.

The controller 800 controls and processes an overall operation of the terminal, and according to the present disclosure, includes the routing path controller 802 to control and process a function for configuring a routing path between a source terminal and a target terminal. That is, the routing path controller 802 includes a projection line calculator 804 to control and process a function for calculating a length of a projection line which reaches from a corresponding terminal to the target terminal if the terminal is a source terminal or an intermediary terminal, and for transmitting a Q-RREQ message including the calculated length of the projection line to neighboring terminals. In addition, the routing path controller 802 includes a red zone determining unit 806 to control and process a function for determining a red zone of a corresponding terminal if the terminal is a source terminal or an intermediary terminal, and for selecting a next terminal, i.e., a next intermediary terminal, of a routing path on the basis of the red zone and a region indicating a movement radius of a neighboring terminal. In this case, the routing path controller 802 receives an A-RREQ message from the neighboring terminal, determines a candidate intermediary terminal to neighboring terminals of which a movement radius region of a neighboring terminal overlaps with a region other than a red zone from among regions corresponding to a maximum transmission radius of the terminal, and selects a terminal having a longest shadow line as a next terminal from among the candidate intermediary terminals. The routing path controller 802 controls and processes a function for transmitting a D-RREQ message to a selected next terminal to report that it is selected as an intermediary node.

In addition, the routing path controller 802 includes a shadow line calculation unit 808 to control and process a function for calculating a length of a shadow line upon receiving from a neighboring terminal a Q-RREQ message of which a target terminal is another terminal, and for transmitting an A-RREQ message including the calculated length of the shadow line to the terminal which transmits the Q-RREQ message. In addition, the routing path controller 802 controls and processes a function for transmitting an RREP message upon receiving a Q-RREQ message of which a target terminal is the terminal itself from the neighboring terminal.

In addition, the routing path controller 802 controls and processes a function for writing information of a next terminal in a routing table 822 if the next terminal is selected, and for writing information of a previous terminal in the routing table if a D-RREQ is received from the neighboring table. That is, the routing path controller 802 controls and processes the functions described above in FIG. 3 to FIG. 7.

The transceiver 810 processes signal transmission and reception with respect to a neighboring terminal, a next terminal, a previous terminal, or a target terminal under the control of the controller 800.

The storage unit 820 stores data and various programs required for an operation of the terminal, and includes the routing table 822 according to the present disclosure. The routing table 822 is written by the routing path controller 802, and if an error occurs in the routing path, can be updated by the routing path controller 802. The routing table 822 may include an ID of a source terminal, an ID of a target terminal, an ID of a previous terminal, and an ID of a next terminal. In addition, the routing table 822 may include location information of the source terminal, location information of the target terminal, location information of the previous terminal, and location information of the next terminal.

Figure 9:
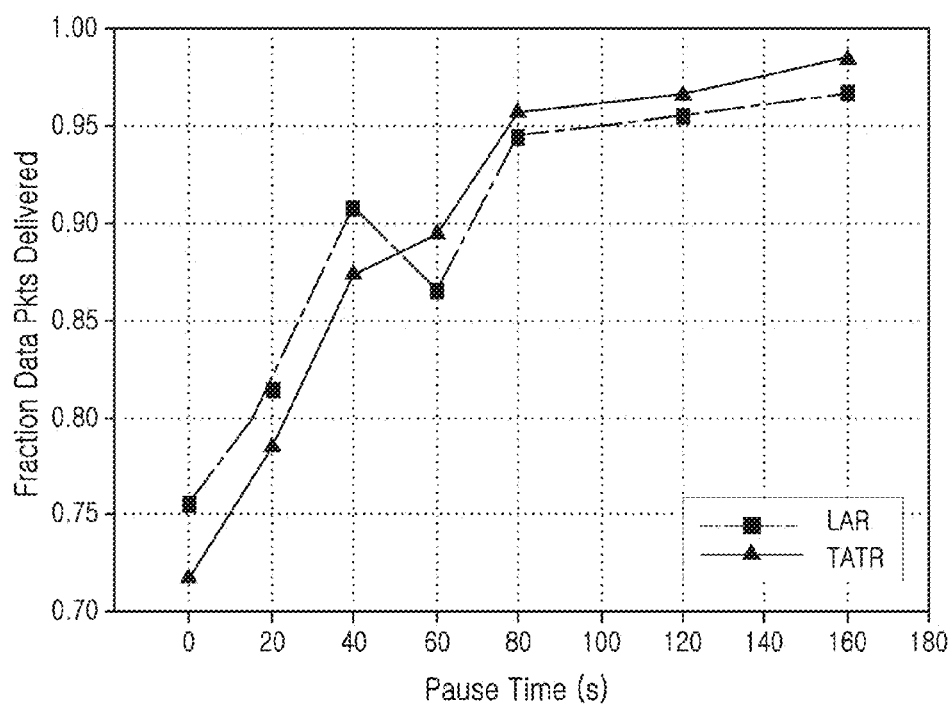
FIG. 9 and FIG. 10 are graphs illustrating performance on a routing path configuration according to the related art and an embodiment of the present disclosure.
Figure 10:
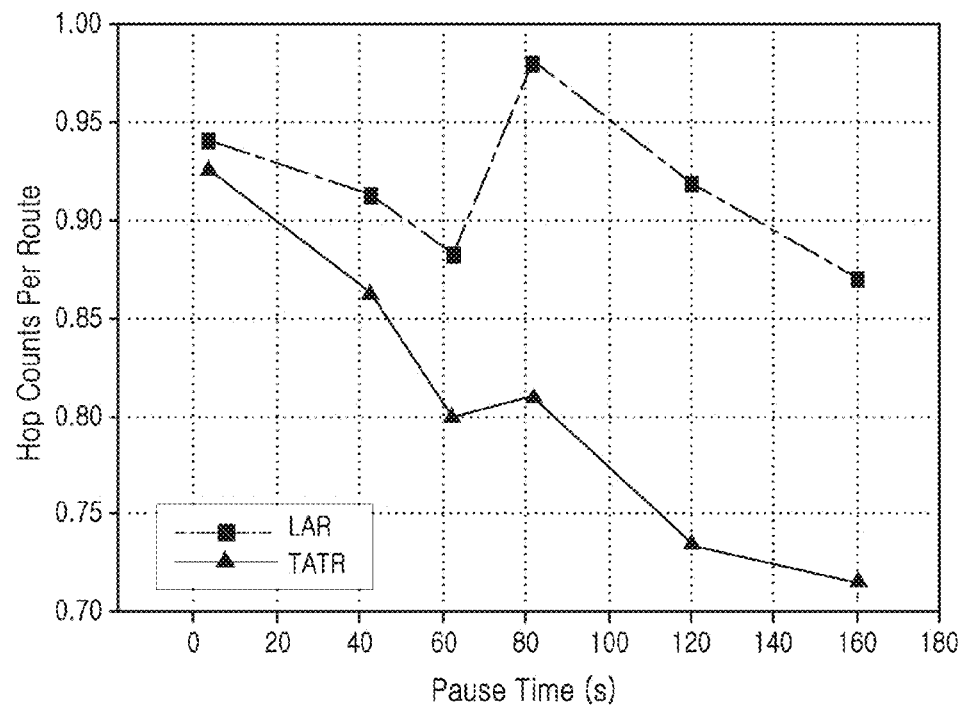

FIG. 9 and FIG. 10 are graphs illustrating performance on a routing path configuration according to the related art and an embodiment of the present disclosure. Herein, LAR denotes a Location-Aided Routing (LAR) algorithm described in the prior art, and TATR denotes a method proposed in the present disclosure.

Referring to FIG. 9, a horizontal axis represents a time at which a terminal temporarily stops its moving while the terminal moves, and a vertical axis represents a probability that a packet is successfully delivered. If a pause time of the terminal is within 0 to 40 seconds, it can be seen that the conventional LAR scheme has a higher packet delivery success rate that the TATR scheme of the present disclosure, whereas if the pause time of the terminal is greater than or equal to 60 seconds, the TATR scheme proposed in the present disclosure has a higher packet delivery success rate than the conventional LAR scheme.

Referring to FIG. 10, a horizontal axis represents a time at which a terminal temporarily stops its moving while the terminal moves, and a vertical axis represents the number of hops of a routing path. It can be seen that the TATR scheme of the present disclosure has a less number of hops of the routing path than the conventional LAR scheme. That is, it can be seen than, if the routing path is configured according to the TATR scheme of the present disclosure, the number of intermediary terminals included in the routing path between a source terminal and a target terminal is less than that of a case of configuring the routing path according to the conventional LAR scheme. Accordingly, this leads to an effect of decreasing transmit power and computation power of an overall system.

Although not shown, the TATR scheme of the present disclosure has an advantage in that the number of times of transmitting a control message for configuring a routing path can be decreased in comparison with the conventional LAR scheme.

According to the present disclosure, since a routing path is configured by using a linear virtual line which reaches from a source terminal to a target terminal on the basis of location information of a terminal in a wireless communication, each terminal performs an independent computation without a complex computation process, and thus there is an advantage in that an optimal data routing path can be configured by using a minimum number of intermediary terminals. In addition, according to the present disclosure, a region excluded in selection of an intermediary node is determined on the basis of a maximum speed of a terminal, and thereafter a terminal for taking a role of an intermediary node is selected from the remaining terminals other than a terminal capable of breaking a data routing path on the basis of the determined region excluded in selection of the intermediary node, thereby being able to configure a reliable routing path.

At this point, it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a terminal comprising:
    transmitting, to at least one neighboring terminal, information for indicating a location of the terminal and a location of a target terminal;
    receiving, from the at least one neighboring terminal, distance information associated with the terminal and each of the at least one neighboring terminal; and
    identifying, among the at least one neighboring terminal, a routing node based on the distance information and whether the routing node is located within a pre-determined zone,
    wherein the distance information is identified based on the location of the terminal and a point information,
    wherein the point information indicates a position at which a first projection line from the terminal to the target terminal intersects a second projection line from each of the at least one neighboring terminal being perpendicular to each other, and
    wherein the pre-determined zone is identified based on a transmission radius and a movement radius of the terminal.

2. The method of claim 1, wherein the method of the terminal is repeatedly performed by the routing node.

3. The method of claim 1, further comprising:
    updating information of the routing node in a routing table; and
    transmitting a signal indicating selection as the routing node of the routing path to the routing node.

4. The method of claim 3, further comprising:
    detecting whether a response signal is received within a pre-set time;
    if the response signal is received within the pre-set time, determining whether a terminal transmitting the response signal is identical to the routing node included in the routing table; and
    if the terminal transmitting the response signal is identical to the routing node included in the routing table, completing a configuration of the routing path.

5. The method of claim 4, further comprising:
    reselecting the routing node by retransmitting, to the at least one neighboring terminal, the information for indicating the location of the terminal and the location of the target terminal, if the response signal is not received within the pre-set time or if the terminal transmitting the response signal is not identical to the routing node included in the routing table.

6. An operating method of a neighboring terminal comprising:
receiving, from a terminal, information for indicating a location of the terminal and a location of a target terminal;
generating, based on the location of the terminal and a point information, distance information associated with the terminal and the neighboring terminal; and
transmitting, to the terminal, the distance information,
wherein the point information indicates a position at which a first projection line from the terminal to the target terminal intersects a second projection line from the neighboring terminal being perpendicular to each other, and
wherein the neighboring terminal is located within a pre-determined zone which is identified, by the terminal, based on a transmission radius and a movement radius of the terminal.

7. The method of claim 6, further comprising:
receiving a signal indicating selection as the routing node from the terminal; and
performing an operation as the terminal.

8. The method of claim 6, further comprising transmitting a response signal to the terminal if the neighboring terminal is identical to the target terminal.

9. A terminal comprising:
a transceiver configured to transmit and receive a signal with at least one neighboring terminal; and
a processor configured to:
transmit, to at least one neighboring terminal, information for indicating a location of the terminal and a location of a target terminal,
receive, from the at least one neighboring terminal, distance information associated with the terminal and each of the at least one neighboring terminal, and
identify, among the at least one neighboring terminal, a routing node based on the distance information and whether the routing node is located within a pre-determined zone,
wherein the distance information is identified, by the processor, based on the location of the terminal and a point information,
wherein the point information indicates a position at which a first projection line drawn from the terminal to the target terminal intersects a second projection line drawn from each of the at least one neighboring terminal being perpendicular to each other, and
wherein the pre-determined zone is identified, by the processor, based on a transmission radius and a movement radius of the terminal.

10. The first terminal of claim 9,
wherein an operation of the terminal is repeatedly performed by the routing node.

11. The first terminal of claim 9, wherein the processor is further configured to:
update information of the routing node in a routing table, and
transmit a signal indicating selection as the routing node to the determined routing node.

12. The first terminal of claim 9, wherein the processor is further configured to:
detect whether a response signal is received without a pre-set time,
if the response signal is received within the pre-set time, determine whether a second terminal transmitting the response signal is identical to the routing node included in the routing table, and
if a terminal transmitting the response signal is identical to the routing node included in the routing table, complete a configuration of the routing path.

13. The first terminal of claim 12, wherein the processor is further configured to reselect the routing node by retransmitting, to the at least one neighboring terminal, the information for indicating the location of the terminal and the location of the target terminal, if the response signal is not received within the pre-set time or if the terminal transmitting the response signal is not identical to the routing node included in the routing table.

14. A neighboring terminal comprising:
a transceiver configured to transmit and receive a signal with a second terminal; and
a processor configured to:
receive, from a terminal, information for indicating a location of the terminal and a location of a target terminal,
generate, based on the location of the terminal and a point information, distance information associated with the terminal and the neighboring terminal, and
transmit, to the terminal, the distance information,
wherein the point information indicates a position at which a first projection line from the terminal to the target terminal intersects a second projection line from the neighboring terminal being perpendicular to each other, and
wherein the neighboring terminal is located within a pre-determined zone which is identified, by the terminal, based on a transmission radius and a movement radius of the terminal.

15. The first neighboring terminal of claim 14, wherein the processor is further configured to:
receive a signal indicating selection as the routing node from the terminal, and
perform an operation as the terminal.

16. The neighboring terminal of claim 14, wherein the processor is further configured to transmit a response signal to the terminal if the neighboring terminal is identical to the target terminal.

* * * * *